United States Patent
Furukawa et al.

Patent Number: 5,277,998
Date of Patent: Jan. 11, 1994

[54] HYDROGEN-ABSORBING ALLOY ELECTRODE

[75] Inventors: Akio Furukawa; Fusago Mizutaki; Ikuo Yonezu, all of Osaka; Toshihiko Saitoh, Kyoto; Nobuhiro Furukawa, Osaka, all of Japan

[73] Assignee: Sanyo Electric Co., Ltd., Osaka, Japan

[21] Appl. No.: 876,721

[22] Filed: Apr. 9, 1992

[30] Foreign Application Priority Data

Apr. 10, 1991 [JP] Japan .................................. 3-077865

[51] Int. Cl.$^5$ ...................... H01M 4/58; H01M 10/52; C22C 14/00
[52] U.S. Cl. ...................................... 429/59; 429/218; 429/223; 420/417; 420/900
[58] Field of Search .......................... 429/218, 223, 59; 420/900, 417; 252/182.1

[56] References Cited

U.S. PATENT DOCUMENTS

| | | | |
|---|---|---|---|
| 4,898,794 | 2/1990 | Doi et al. | 429/223 X |
| 4,923,770 | 5/1990 | Grasselli et al. | |
| 5,008,164 | 4/1991 | Furukawa et al. | 420/900 X |
| 5,135,589 | 8/1992 | Fetcenko et al. | 420/900 X |

FOREIGN PATENT DOCUMENTS

| | | |
|---|---|---|
| 59-78908 | 5/1984 | Japan . |
| 59-50744 | 12/1984 | Japan . |
| 60-241652 | 11/1985 | Japan . |
| 63-284758 | 11/1988 | Japan . |
| 64-48370 | 2/1989 | Japan . |

*Primary Examiner*—John S. Maples
*Attorney, Agent, or Firm*—Wegner, Cantor, Mueller & Player

[57] ABSTRACT

Disclosed is a hydrogen-absorbing alloy electrode including a hydrogen-absorbing alloy capable of absorbing and desorbing hydrogen reversibly, the electrode being characterized in that the hydrogen-absorbing alloy forms a multi-phase structure composed of at least these three phases, a main alloy phase, an alloy phase of $Ti_2Ni$ system cubic-structure and an alloy phase of Ti-Ni system monoclinic-structure, and the main alloy phase has TiMo-based crystalline cubic-structure.

16 Claims, 10 Drawing Sheets

Values of x in an alloy, $(Ti_{0.95}Zr_{0.05})_{1-x}(Mo_{0.7}Ni_{0.3})_x$

Values of a in an alloy, $(Ti_{1-a}Zr_a)_{1.5}Mo_{0.7}Ni_{0.3}$ $Ti_{1.4}Zr_{0.1}Mo_{0.7}Ni_{0.3}$ $Ti_{1.5}Mo_1$

| Cells | Hydrogen-absorbing alloys | Discharge capacity (mAh/g) |
|---|---|---|
| B1 | $Ti_{1.4}Zr_{0.1}Mo_{0.7}Ni_{0.3}$ | |
| B2 | $Ti_{1.2}Hf_{0.3}Mo_{0.75}Ni_{0.25}$ | |
| B3 | $Ti_{1.4}Mg_{0.1}Mo_{0.8}Ni_{0.2}$ | |
| B4 | $Ti_{1.6}Y_{0.4}Mo_{0.6}Ni_{0.4}$ | |
| B5 | $Ti_{0.95}La_{0.05}Mo_{0.7}Ni_{0.7}$ | |
| B6 | $Ti_{2.5}Nd_{1.0}Mo_{0.6}Ni_{0.4}$ | |
| B7 | $Ti_{1.6}Nb_{0.2}Mo_{0.65}Ni_{0.35}$ | |
| B8 | $Ti_{0.7}Ta_{0.3}Mo_{1.2}Ni_{0.2}$ | |

● After 300 cycles   ○ Initial capacity

Values of x in an alloy, $(Ti_{0.9}Zr_{0.1})_{1-x}(Mo_{0.8}V_{0.2})_xNi_{0.25}$

Values of a in an alloy, $(Ti_{1-a}Zr_a)_{0.7}(Mo_{0.8}V_{0.2})_{0.3}Ni_{0.25}$

Values of b in an alloy, $(Ti_{0.9}Zr_{0.1})_{0.7}(Mo_{1-b}V_b)_{0.3}Ni_{0.25}$

Values of c in an alloy, $(Ti_{0.9}Zr_{0.1})_{0.7}(Mo_{0.8}V_{0.2})_{0.3}Ni_c$

HYDROGEN-ABSORBING ALLOY ELECTRODE

BACKGROUND OF THE INVENTION (1) Field of the Invention

This invention relates to a hydrogen-absorbing alloy electrode used as a negative electrode of a metal-hydrogen alkaline storage cell.

(2) Description of the Prior Art

Lead cells and nickel-cadmium cells have long been in wide use as storage cells. In recent years, however, a nickel-hydrogen alkaline storage cell has been drawing attention because it is lighter in weight and has larger capacity than these cells. The nickel-hydrogen alkaline storage cell comprises a negative electrode made from a hydrogen-absorbing alloy capable of reversibly absorbing and desorbing hydrogen, and a positive electrode made from metallic oxide such as nickel hydroxide.

Such a hydrogen-absorbing alloy used for a negative electrode is required to be able to reversibly absorb and desorb hydrogen around room temperature. Developed to meet the requirement are Mm-Ni system alloys (disclosed in Japanese Laid-Open Patent Application No. 60-89066), Ti system alloys (disclosed in Japanese Patent Publication No. 59-50744) and others.

The Mm-Ni system alloys are already put to practical use, but new alloys of Ti system or Zr system are proposed to realize larger capacity, such as ones in Japanese Laid-Open Patent Applications 59-78908, 60-241652, 63-284758, 64-48370 and U.S. Pat. No. 4,923,770. Drawing special attention among them is a Ti-Mo alloy having TiMo-based crystalline cubic-structure, because it has the advantage of reversibly absorbing and desorbing larger amounts of hydrogen in a solid-gas reaction than rate-earth-Ni system alloys.

However, the above-mentioned new alloys of Ti system or Zr system having larger capacity than the Mm-Ni system alloys have a disadvantage of low productivity because it is difficult to crush the alloys due to their hardness and ductility.

Also, cells employing the Ti system alloy have the same disadvantage of low productivity because it takes a long time to carry out an activation treatment.

SUMMARY OF THE INVENTION

A primary object of the present invention, therefore, is to provide a hydrogen-absorbing alloy electrode which is made from a hydrogen-absorbing alloy capable of being powdered more easily, and which can be produced in a shorter activation treatment time, resulting in having improved productivity.

Another object of the present invention is to provide a hydrogen-absorbing alloy electrode with which larger capacity of a cell can be realized.

Another object of the present invention is to provide a hydrogen-absorbing alloy electrode with which lengthening of the life of a cell can be realized.

The above objects are fulfilled by a hydrogen-absorbing alloy electrode including a hydrogen-absorbing alloy capable of absorbing and desorbing hydrogen reversibly, the electrode being characterized in that the hydrogen-absorbing alloy forms a multi-phase structure composed of at least these three phases, a main alloy phase, an alloy phase of Ti$_2$Ni system cubic-structure and an alloy phase of Ti-Ni system monoclinic-structure, and the main alloy phase has a TiMo-based crystalline cubic structure.

An alloy expressed by the general formula (I) as follows may be used for the alloy phase of the TiMo-based crystalline cubic-structure.

$$Ti_{1-x}Mo_x \quad (I)$$

In the general formula (I), the range of x is $0.2 < x < 0.6$.

The composition of the entire hydrogen-absorbing alloy may be expressed by the general formula (II) as follow.

$$(Ti_{1-a}A_a)_{1-x}(Mo_{1-b}Ni_b)_x \quad (II)$$

In the general formula (II), A is one or more elements selected from the group consisting of zirconium, hafnium, magnesium, yttrium, rare-earth element, niobium, neodymium or tantalum, and the ranges of a, b and x are respectively, $0.5 \leq a \leq 0.3$, $0.1 \leq b \leq 0.5$ and $0.2 < x < 0.6$.

The composition of the entire hydrogen-absorbing alloy may be expressed by the general formula (III) as follows.

$$(Ti_{1-a}A_a)_{1-x}(Mo_{1-b}B_b)_xNi_c \quad (III)$$

In the general formula (III), A is one or more elements selected from the group consisting of zirconium, hafnium, magnesium, yttrium, rare-earth element, niobium, neodymium or tantalum and B is one or more elements selected from the group consisting of vanadium, chromium, tungsten, manganese, iron, copper, boron, carbon or silicon, and the ranges of a, b, c and x are respectively, $0.05 \leq a \leq 0.3$, $0.1 \leq b \leq 0.4$, $0.1 \leq c < 0.4$ and $0.2 < x \leq 0.4$.

The above objects can be fulfilled because of the following reasons.

The hydrogen-absorbing alloy of the present invention is based on the above-mentioned alloy having TiMo-based crystalline cubic-structure disclosed in Japanese Laid-Open Patent Application No. 59-78908. As noted above, the Ti-Mo alloy has the advantage of reversibly absorbing and desorbing larger amounts of hydrogen in a solid-gas reaction than rare-earth-Ni system alloys.

However, a cell employing the Ti-Mo alloy has a very small discharge capacity, which corresponds to the electrochemical amount of desorbed hydrogen. Even when a third element such as Ni is added to continuous solid solutions of Ti and Mo to the solubility limit as the above disclosure, almost no discharge capacity is obtained as well.

After various experiments, the inventors of this invention found that great discharge capacity could be obtained by employing an alloy produced by adding or substituting Ni which catalyzes electrochemical hydrogen absorbing and releasing reactions, to or for a Ti-Mo alloy over the solubility limit and at a particular ratio of composition.

The metal composition of the alloy was analyzed to investigate the cause of the increase of the discharge capacity found as above, and as a result the following were found. That is, producing an alloy by adding or substituting Ni to or for a Ti-Mo alloy having cubic-structure over the solubility limit and at a particular ratio makes its metal composition heterogenous, and consequently forms an alloy having multiphase structure by the precipitation of alloy phases of Ti$_2$Ni system cubic-structure and Ti-Ni system monoclinic-structure besides the main alloy phase of the Ti-Mo system. According to this structure, the precipitated Ti-Ni system alloy phase is considered to strongly catalyze the electrochemical hydrogen absorbing and desorbing reaction, contributing to increases in the discharge capacity of the Ti-Mo system alloy.

According to the construction of this invention, such an alloy is obtained that can be powdered more easily than the alloys of Ti system or Zr system which have larger capacity than Mn-Ni system alloys. Also, a cell employing an alloy of this invention demands a shorter activation treatment time than the above-mentioned alloys of Ti system or Zr system. This is considered to result from easy development of cracks during crushing of the alloy or repeated charge/discharge operation of the cell.

The hydrogen-absorbing alloy having multi-phase structure may be annealed.

The anneal treatment temperature may be in the range from the melting point of the hydrogen-absorbing alloy to a temperature 500° C. below the melting point.

According to the above construction, it was confirmed that increases in the discharge capacity of 10% or more, as well as easier crushing and shorter activation treatment time could be realized. This is considered to result from the fact that the main phase interior of the Ti-Mo system alloy, which is most concerned with charge/discharge operation, is more homogenized than as-casted alloy.

The hydrogen-absorbing alloy having multi-phase structure may be rapidly quenched.

The quenching speed may be more than $10^3$ K/sec.

According to the above construction, as well, it was confirmed that increases in the discharge capacity of 10% or more, as well as easier crushing and shorter activation treatment time could be realized. This is considered to result from the fact that the area of the main phase of the Ti-Mo system alloy, which is most concerned with charge/discharge operation, expands because precipitation of other phases than the main phase can be restrained by rapid quenching even when the stoichiometric ratio of the alloy varies.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

Embodiment 1

Example

Figure 1:
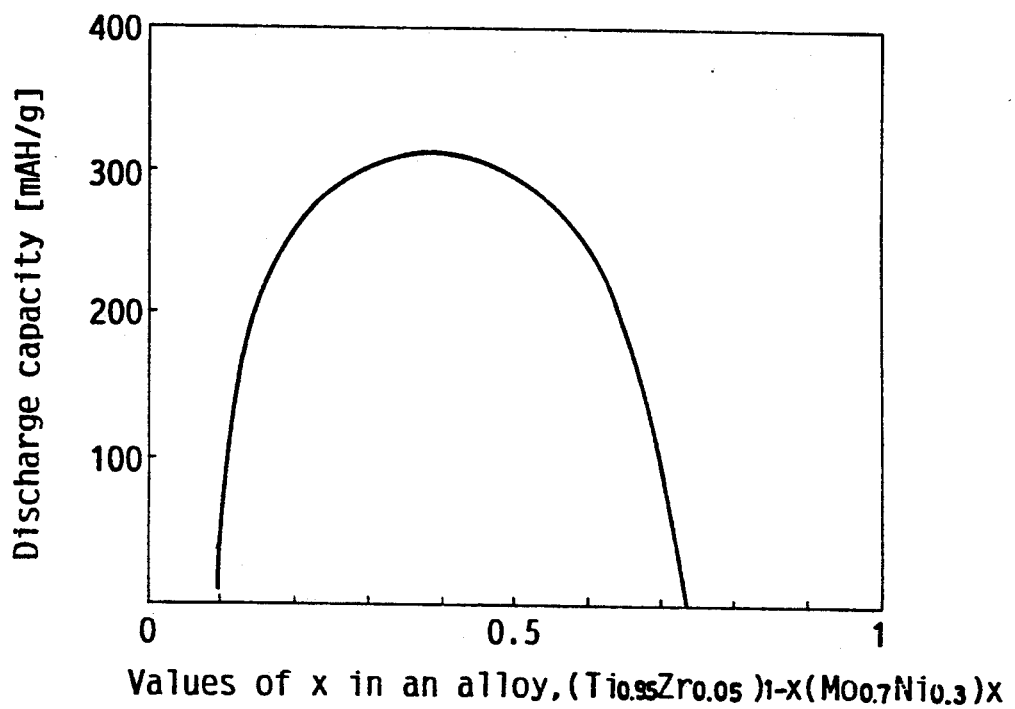
FIG. 1 is a graph showing a relationship between a value of X in an alloy expressed by $(Ti_{0.95}Zr_{0.05})_{1-x}(Mo_{0.7}Ni_{0.3})_x$ and the discharge capacity.

First, titanium (Ti), zirconium (Zr), molybdenum (Mo) and nickel (Ni), all of which have over 99% purity and are commercially available, were weighted to be in an elemental ratio of 1.4:0.1:0.7:0.3, and melted to produce a melt in an arc welding furnace, using an argon atmosphere. Next, the melt was cooled to produce an ingot of a hydrogen-absorbing alloy expressed by $Ti_{1.4}Zr_{0.1}Mo_{0.7}Ni_{0.3}$.

The alloy thus produced is hereinafter referred to as Alloy (a).

A hydrogen-absorbing alloy electrode employing the above alloy ingot was produced in the following process. First, the ingot of a hydrogen-absorbing alloy was powdered to particles 50 micrometer or less in diameter. Next, 10 wt % of nickel powder as a conductive material and 10 wt % of fluorocarbon polymers powder as a binder were added to 80 wt % of the powdered alloy, and they were kneaded together to fiberize the fluorocarbon polymers. Then, the obtained mixture was wrapped with nickel meshes and finally pressurized with a force of 3 ton/cm².

Comparative Examples 1-6

Alloys expressed by the following general formulas which are considered to have larger capacity than Mm-Ni system alloys, were produced in the same way as the Example. They are $Ti_{0.5}Mo_{0.5}Co_{1.0}$ (refer to Japanese Patent Publication No. 59-50744), $Ti_{0.6}Mo_{0.4}$ (refer to Japanese Laid-Open Patent Application No. 59-78908), $Zr_{1.0}Mn_{0.6}Cr_{0.2}Ni_{1.2}$ (refer to Japanese Laid-Open Patent Application No. 60-241652), $Ti_{0.7}Zr_{0.3}Cr_{1.5}Ni_{0.5}$ (refer to Japanese Laid-Open Patent Application 63-284758), $Zr_{1.0}Mo_{0.3}Ni_{1.7}$ (refer to Japanese Laid-Open Patent Application 64-48370) and $Pd_{20}Mo_{30}Ti_{50}$ (refer to U.S. Pat. No. 4,923,770).

The hydrogen-absorbing alloys thus produced are hereinafter referred to as Alloys(x1)-(x6) respectively.

Experiment 1

The Alloy(a) used for a hydrogen-absorbing alloy electrode of the present invention was compared with the Alloys(x1)-(x6) of the Comparative Example to examine their degrees of difficulty in crushing, and the results are shown in Table 1 below. In the experiment, the time was measured which was required to produce 2 g of particles 50 micrometer or less in diameter, by crushing 5 g of each alloy ingot with a pulverizer. In Table 1, the time required to crush the Alloy(a) is made 1.

TABLE 1

| Hydrogen-absorbing alloys | the ratio of time required for powdered alloy |
|---|---|
| a ($Ti_{1.4}Zr_{0.1}Mo_{0.7}Ni_{0.3}$) | 1 |
| x1 ($Ti_{0.5}Mo_{0.5}Co_{1.0}$) | 2 |
| x2 ($Ti_{0.6}Mo_{0.4}$) | 3 |
| x3 ($Zr_{1.0}Mn_{0.6}Cr_{0.2}Ni_{1.2}$) | 1.5 |
| x4 ($Ti_{0.7}Zr_{0.3}Cr_{1.5}Ni_{0.5}$) | 2 |
| x5 ($Zr_{1.0}Mo_{0.3}Ni_{1.7}$) | 1.5 |
| x6 ($Pd_{20}Mo_{30}Ti_{50}$) | 1.5 |

As apparent from Table 1 above, it was confirmed that the Alloy(a) of the present invention could be powdered more easily than the Alloys(x1)-(x6) of the Comparative Example which are considered to have larger capacity than the Mm-Ni system alloys. It was also confirmed through an experiment that the Alloy(a) of the present invention demanded shorter activation treatment time than the Alloys(x1)-(x6) of the Comparative Example, which is not noted in Table 1.

Experiment 2

A cell was produced by employing a hydrogen-absorbing alloy expressed by the general formula (II)-1 below (a value of X varies at the range of $0.1 \leq X \leq 0.9$), and a relationship between a value of X and the discharge capacity was examined after 100 cycles of charge/discharge operation were carried out. The results are shown in FIG. 1.

$$(Ti_{0.95}Zr_{0.05})_{1-x}(Mo_{0.7}Ni_{0.3})_x \qquad \text{(II)-1}$$

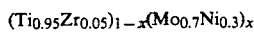

The experiment was conducted under the conditions that the cell was charged with a fixed current of 25 mA for 10 hours, and discharged with the same fixed current of 25 mA until the cell voltage became 1.0 V.

The enclosed nickel-hydrogen alkaline storage cell used for the experiment was produced as follows.

First, hydrogen-absorbing alloy ingot expressed by the general formula (II)-1, and then a hydrogen-absorbing alloy electrode were produced in the same way as the Example. The amount of hydrogen-absorbing alloy powder used for the electrode was 0.5 g. Finally, the hydrogen-absorbing alloy electrode and a well-known sintered nickel electrode whose theoretical discharge capacity is 600 mAh were combined. Here, 30 wt % of a potassium hydroxide aqueous solution was used as alkaline electrolyte.

As is apparent from FIG. 1, the discharge capacity gradually increases according to the increase of X, reaches its maximum when the value of X is 0.4, and decreases gradually when the value of X exceeds 0.4. When the range of X is $0.2 < X < 0.6$, the discharge capacity grows up to 250 mAh/g or more. Consequently, the preferable range of X in the general formula (II)-1 is $0.2 < X < 0.6$.

Experiment 3

Figure 2:
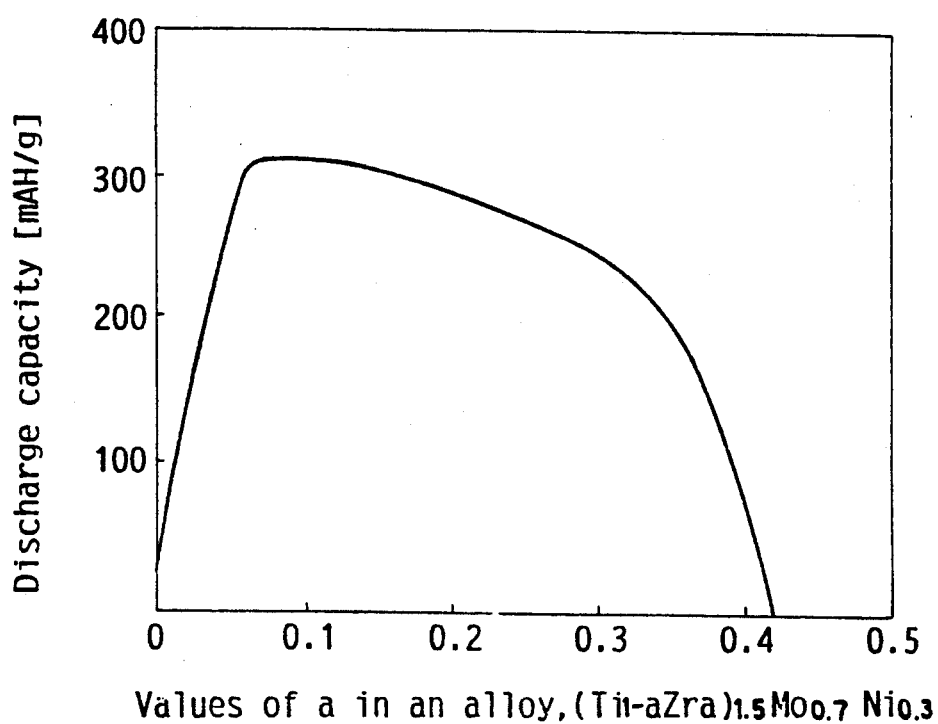
FIG. 2 is a graph showing a relationship between a value of a in an alloy expressed by $(Ti_{1-a}Zr_a)_{1.5}Mo_{0.7}Ni_{0.3}$ and the discharge capacity.

A cell was produced by employing a hydrogen-absorbing alloy expressed by the general formula (II)-2 below (a value of a varies), and the relationship between the value of a and the discharge capacity was examined after 100 cycles of charge/discharge operation were carried out. The results are shown in FIG. 2.

$$(Ti_{1-a}Zr_a)_{1.5}Mo_{0.7}Ni_{0.3} \qquad \text{(II)-2}$$

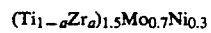

The experiment was conducted under the same conditions as those of the Experiment 2. The cell used for the experiment has the same construction as the one used for the Experiment 2 except that a hydrogen-absorbing alloy expressed by the general formula (II)-2 was used.

As apparent from FIG. 2, the discharge capacity grows up to 250 mAh/g or more when the range of a is $0.05 \leq a \leq 0.3$. Consequently, the preferable range of a in the general formula (II)-2 is $0.05 \leq a \leq 0.3$.

Experiment 4

Figure 3:
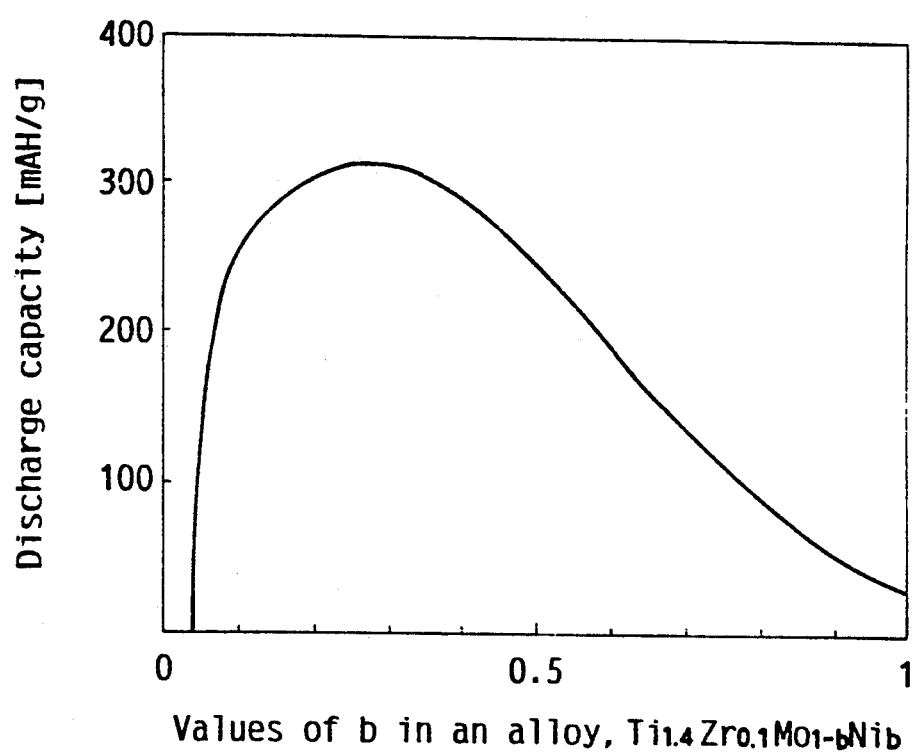
FIG. 3 is a graph showing a relationship between a value of b in an alloy expressed by $Ti_{1.4}Zr_{0.1}Mo_{1-b}Ni_b$ and the discharge capacity.

A cell was produced by employing a hydrogen-absorbing alloy expressed by the general formula (II)-3 below (a value of b varies), and a relationship between a value of b and the discharge capacity was examined after 100 cycles of charge/discharge operation were carried out. The results are shown in FIG. 3.

$$Ti_{1.4}Zr_{0.1}Mo_{1-b}Ni_b \qquad \text{(II)-3}$$

The experiment was conducted under the same conditions as those of the Experiment 2. The cell used for the experiment has the same construction as the one used for the Experiment 2 except that a hydrogen-absorbing alloy expressed by the above general formula (II)-3 was used.

As is apparent from FIG. 3, the discharge capacity grows up to 250 mAh/g or more when the range of b is $0.1 \leq b \leq 0.5$. Consequently, the preferable range of b in the general formula (II)-3 is $0.1 \leq b \leq 0.5$.

Conclusion of Experiments 2-4

As apparent from the Experiments 2-4, the preferable ranges of x, a and b in a hydrogen-absorbing alloy expressed by the general formula (II)-4 are respectively $0.2 < x < 0.6$, $0.05 \leq a \leq 0.3$ and $0.1 \leq b \leq 0.5$.

$$(Ti_{1-a}Zr_a)_{1-x}(Mo_{1-b}Ni_b)_x \qquad \text{(II)-4}$$

Experiment 5

The alloy(a) of the present invention was analyzed by use of a scanning electron microscope(SEM), an electron probe microanalyser(EPMA) and powder X-ray diffraction in order to find out the reason that the alloy is easily powdered and demands a short activation treatment time. As a result, it was confirmed that an alloy phase of $Ti_2Ni$ system cubic-structure and another alloy phase of Ti-Ni system monoclinic-structure precipitated besides the main alloy phase of Ti-Mo system cubic-structure to form an alloy having multi-phase structure.

Figure 4A:
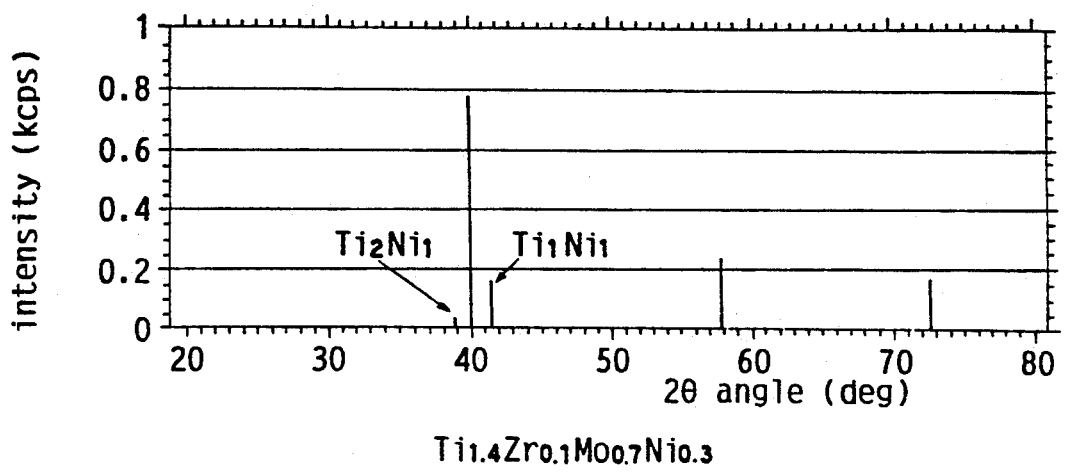
FIG. 4 is a diagram showing analyzed results of an alloy of the present invention and a conventional alloy by use of powder X-ray diffraction.
Figure 4B:
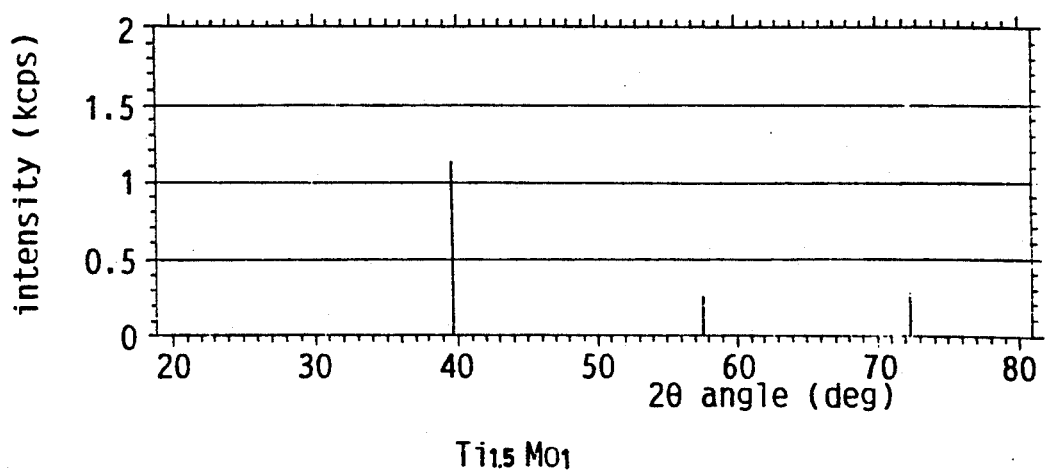

The results analyzed with the powder X-ray diffraction are shown in (a) and (b) of FIG. 4. In FIG. 4, (a) shows the analyzed results of the Alloy(a) of the present invention, and (b) shows those of a TiMo-based alloy, Ti$_{1.5}$Mo, on which the present invention is based. As is apparent from (a) and (b) of FIG. 4, the alloy phase of the Ti-Ni system such as Ti$_2$Ni and Ti-Ni exists in the Alloy(a) of the present invention.

The Ti-Ni system alloy phase which precipitated in the Ti-Mo system alloy is considered to make the discharge capacity of the TiMo-based alloy increase because it strongly catalyzes an electrochemical hydrogen absorbing and desorbing reaction. Also, the precipitation of the Ti-Ni system alloy phase is considered to make the metal composition of the TiMo-based alloy heterogenous, causing some cracks to occur, the alloy to crush easily, and the activation treatment time to shorten during repeated charge/discharge operation. Moreover, it was confirmed that these effects worked best when the compositions of each alloy phase and of the whole alloy are under the conditions shown in the claims of the present invention.

Embodiment 2

A hydrogen-absorbing alloy expressed by the general formula (II) below in which one element of zirconium, hafnium (HF), magnesium (Mg), yttrium (Y), rare-earth element, neodymium (Nd), niobium (Nb) or tantalum (Ta) is employed as A, and a cell having an electrode made therefrom were produced. (the values of x, a and b are respectively, $0.2 < X < 0.6$, $0.05 \leq a \leq 0.3$ and $0.1 \leq b \leq 0.5$)

$$(Ti_{1-a}A_a)_{1-x}(Mo_{1-b}Ni_b)_x \qquad (II)$$

Example 1

An electrode was produced in the same manner as the Example of the Embodiment 1 by employing the hydrogen-absorbing alloy noted in the Example of the Embodiment 1, (Ti$_{1.4}$Zr$_{0.1}$Mo$_{0.7}$Ni$_{0.3}$). Then, a cell was produced in the same manner as the Experiment 2 of the Embodiment 1.

The cell thus produced is referred to as Cell (B1).

Examples 2-8

Figures 5, 6:
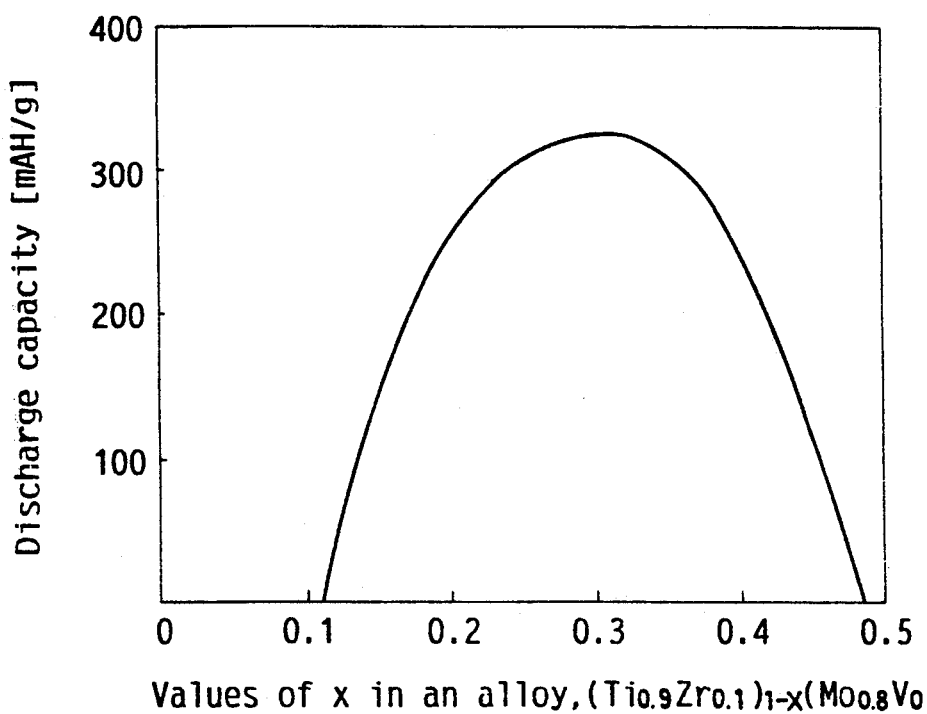
FIG. 5 is a graph showing examined results of the discharge capacity of the Cells(B1)-(B8) in the initial stage and after 300 cycles of charge/discharge operation which employed hydrogen-absorbing alloys of this invention.
FIG. 6 is a graph showing a relationship between a value of X in an alloy expressed by $(Ti_{0.9}Zr_{0.1})_{1-x}(Mo_{0.8}V_{0.2})_xNi_{0.25}$ and the discharge capacity.

Electrodes, and cells employing them were produced in the same manner as the above Example 1 except that the following were used as hydrogen-absorbing alloys as shown in FIG. 5, Ti$_{1.2}$Hf$_{0.3}$Mo$_{0.75}$Ni$_{0.25}$, Ti$_{1.4}$Mg$_{0.1}$Mo$_{0.8}$Ni$_{0.2}$, Ti$_{1.6}$Y$_{0.4}$Mo$_{0.6}$Ni$_{0.4}$, Ti$_{0.95}$La$_{0.05}$Mo$_{0.7}$Ni$_{0.7}$, Ti$_{2.5}$Nd$_{1.0}$Mo$_{0.6}$Ni$_{0.4}$, Ti$_{1.6}$Nb$_{0.2}$Mo$_{0.65}$Ni$_{0.35}$, and Ti$_{0.7}$Ta$_{0.3}$Mo$_{1.2}$Ni$_{0.2}$.

The cells thus produced are hereinafter referred to as Cells(B2)-(B8) respectively.

Experiment

The discharge capacity of the Cells(B1)-(B8) in the initial stage and after 300 cycles of charge/discharge operation which employed hydrogen-absorbing alloys of this invention was examined, and the results are shown in FIG. 5. The conditions of the experiment were the same as those of the Experiment 2 of the Embodiment 1.

As is apparent from FIG. 5, each of the Cells(B-1)-(B8) employing a hydrogen-absorbing alloy of the present invention has a larger discharge capacity both in the initial stage and after 300 cycles of charge/discharge operation.

It was also confirmed through an experiment that the alloy shown in this embodiment was as easy to crush as the one in the Embodiment 1.

Embodiment 3

A hydrigen-absorbing alloy ingot expressed by Ti$_{0.63}$Zr$_{0.07}$Mo$_{0.24}$V$_{0.06}$Ni$_{0.25}$ was produced in the same manner as the Example of the Embodiment 1.

The alloy thus produced is hereinafter referred to as Alloy(c).

Further, an electrode, and a cell employing it were produced in the same manner respectively as the Example and the Experiment 2 of the Embodiment 1.

The cell thus produced is hereinafter referred to as Cell(C).

Comparative Example

The Alloys(x1)-(x6) of the Embodiment 1 were used as Comparative Examples.

Electrodes were produced in the same manner as the Example of the Embodiment 1 by employing these alloys, and then cells were produced in the same manner as the Experiment 2 of the Embodiment 1.

The cells thus produced are hereinafter referred to as Cells(X1)-(X6) respectively.

Experiment 1

The Alloy(c) used for an electrode of the present invention was compared with the Alloys(x1)-(x6) used for those of the Comparative Examples to examine their degrees of difficulty in crushing, and the results are shown in Table 2 below. The experiment was carried out in the same way as the Experiment 1 of the Embodiment 1. In the Table 2, the time required to crush the Alloy(c) is made 1.

TABLE 2

| Alloys | *1) | Cycle number of activation treatment |
|---|---|---|
| a (Ti$_{0.63}$Zr$_{0.07}$Mo$_{0.24}$V$_{0.06}$Ni$_{0.25}$) | 1 | 2 times |
| x1 (Ti$_{0.5}$Mo$_{0.5}$Co$_{1.0}$) | 3 | — |
| x2 (Ti$_{0.6}$Mo$_{0.4}$) | 4 | capacity: below 20 mAh/g — |
| x3 (Zr$_{1.0}$Mn$_{0.6}$Cr$_{0.2}$Ni$_{1.2}$) | 2 | capacity: below 20 mAh/g 8 times |
| x4 (Ti$_{0.7}$Zr$_{0.3}$Cr$_{1.5}$Ni$_{0.5}$) | 3 | 6 times |
| x5 (Zr$_{1.0}$Mo$_{0.3}$Ni$_{1.7}$) | 2 | 4 times |
| x6 (Pd$_{20}$Mo$_{30}$Ti$_{50}$) | 2 | 10 times |

*1) The ratio of the time required for each powdered alloy

As is apparent from Table 2, the Alloy(c) used for an electrode of the present invention can be powdered in a shorter time than the Alloys(x1)-(x6) used for those of the Comparative Examples.

Experiment 2

The Cell(C) employing an electrode of the present invention was compared with the Cells(X1)-(X6) employing those of the Comparative Examples to measure their activation treatment time, and the results are shown in the Table 2. The conditions of the experiment were the same as those of the Experiment 2 of the Embodiment 1. In the Table 2, the discharge cycle numbers of each cell required to gain 90% or more of the maximum discharge capacity (referred to as activation treatment cycle number) are shown.

As is apparent from the Table 2, the Cell(C) employing an electrode of the present invention has the smallest activation treatment cycle number and demands the shortest activation treatment time, as compared with the Cells(X1)–(X6) employing electrodes of the Comparative Examples.

Experiment 3

A cell employing a hydrogen-absorbing alloy expressed by the general formula (III)-1 (the value of x varies.) was produced in the same manner as the Experiment 2 of the Embodiment 1 to examine a relationship between the value of x and the discharge capacity after 100 cycles of charge/discharge operation. The results are shown in FIG. 6. The experiment was carried out under the same conditions as those of the Experiment 2.

$$(Ti_{0.9}Zr_{0.1})_{1-x}(Mo_{0.8}V_{0.2})_x Ni_{0.25} \qquad (III)\text{-}1$$

As is apparent from FIG. 6, the discharge capacity grows up to 250 mAh/g or more when the range of x is $0.2 < x \leq 0.4$. Consequently, the preferable range of x in the general formula (III)-1 is $0.2 < x \leq 0.4$.

Experiment 4

Figure 7:
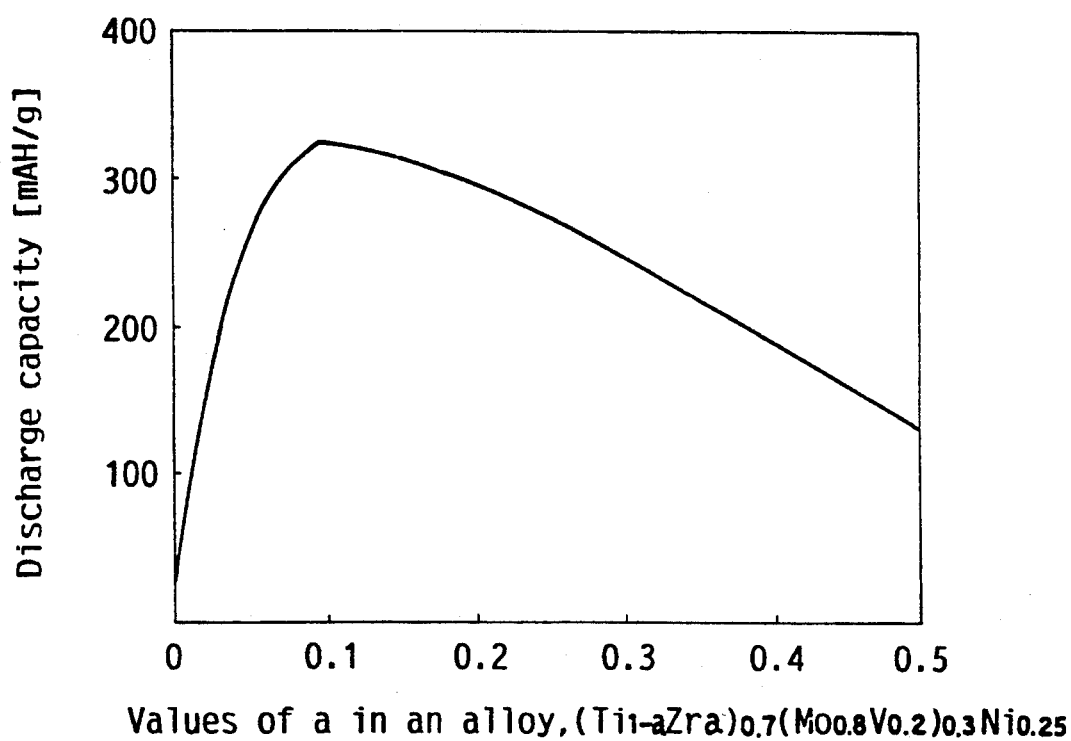
FIG. 7 is a graph showing a relationship between a value of a in an alloy expressed by $(Ti_{1-a}Zr_a)_{0.7}(Mo_{0.8}V_{0.2})_{0.3}Ni_{0.25}$ and the discharge capacity.

A cell employing a hydrogen-absorbing alloy expressed by the general formula (III)-2 (the value of a varies.) was produced in the same manner as the experiment 2 of the Embodiment 1 to examine a relationship between a value of a and the discharge capacity after 100 cycles of charge/discharge operation were carried out, and the results are shown in FIG. 7. The experiment was carried out under the same conditions as those of the second experiment of the first embodiment.

$$(Ti_{1-a}Zr_a)_{0.7}(Mo_{0.8}V_{0.2})_{0.3}Ni_{0.25} \qquad (III)\text{-}2$$

As is apparent from FIG. 7, the discharge capacity grows up to 250 mAh/g or more when the range of a is $0.05 \leq a \leq 0.3$. Consequently, the preferable range of a in the general formula (III)-2 is $0.05 \leq a \leq 0.3$.

Experiment 5

Figure 8:
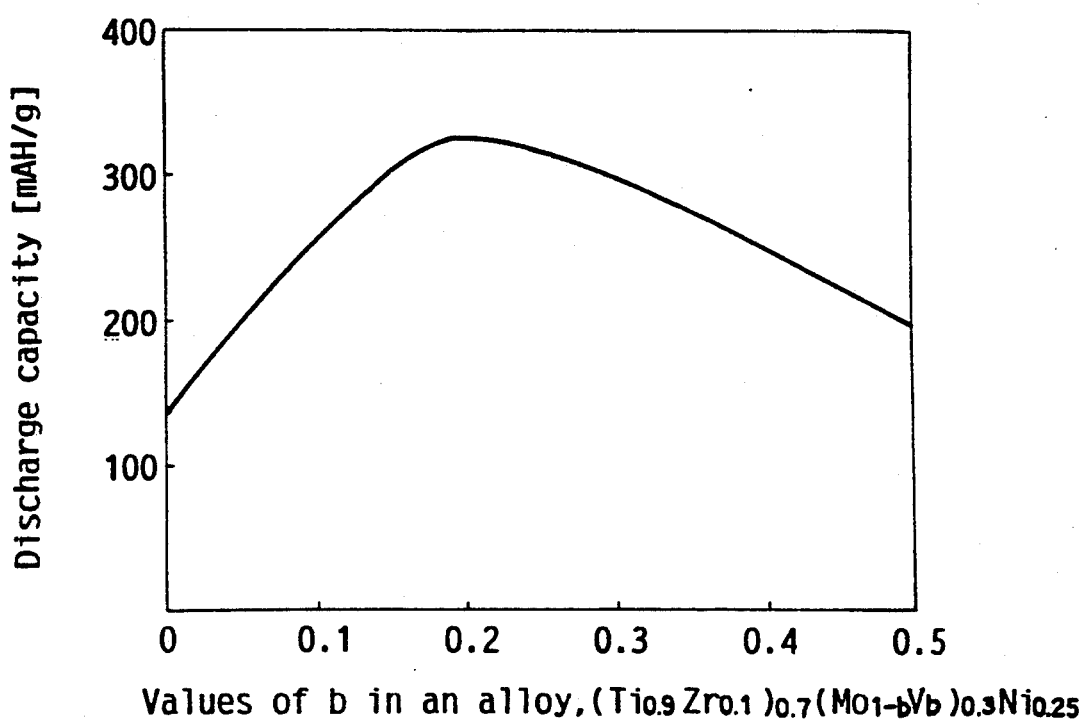
FIG. 8 is a graph showing a relationship between a value of b in an alloy expressed by $(Ti_{0.9}Zr_{0.1})_{0.7}(Mo_{1-b}V_b)_{0.3}Ni_{0.25}$ and the discharge capacity.

A cell employing a hydrogen-absorbing alloy expressed by the general formula (III)-3 (the value of b varies.) was produced to examine a relationship between the value of b and the discharge capacity after 100 cycles of charge/discharge operation were carried out, and the results are shown in FIG. 8. The experiment was carried out under the same conditions as those of the Experiment 2 of the Embodiment 1.

$$(Ti_{0.9}Zr_{0.1})_{0.7}(Mo_{1-b}V_b)_{0.3}Ni_{0.25} \qquad (III)\text{-}3$$

As is apparent from FIG. 8, the discharge capacity increases to 250 mAh/g or more when the range of b is $0.1 \leq b \leq 0.4$. Consequently, the preferable range of b in the general formula (III)-3 is $0.1 \leq b \leq 0.4$.

Experiment 6

Figure 9:
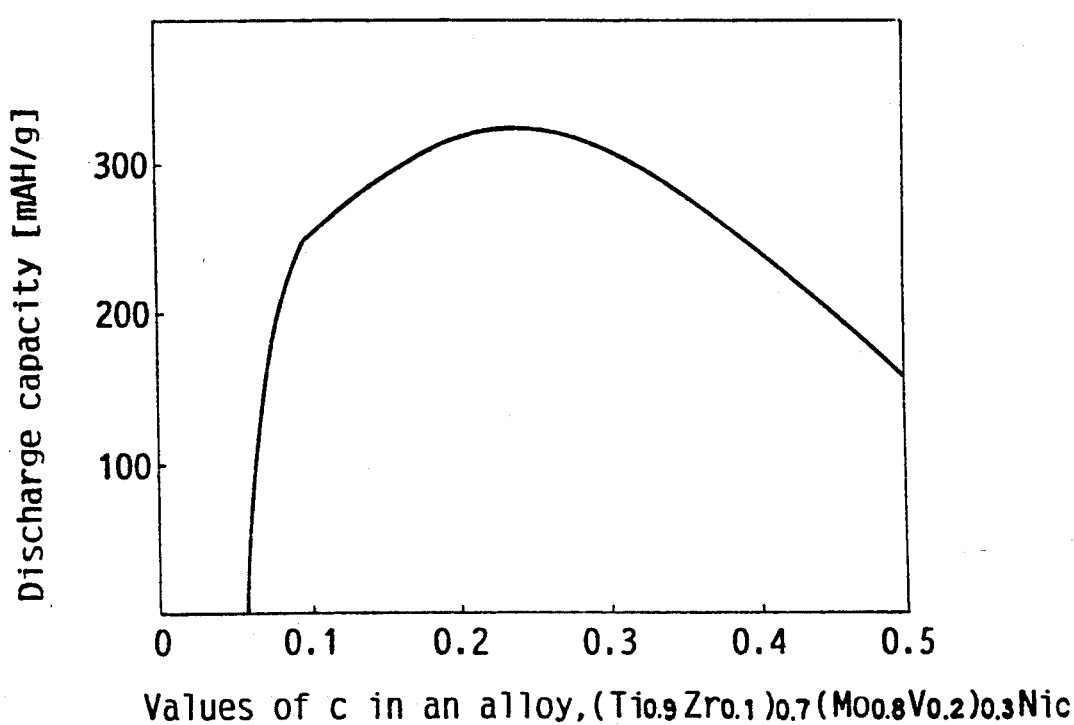
FIG. 9 is a graph showing a relationship between a value of c in an alloy expressed by $(Ti_{0.9}Zr_{0.1})_{0.7}(Mo_{0.8}V_{0.2})_{0.3}Ni_c$ and the discharge capacity.

A cell employing a hydrogen-absorbing alloy expressed by the general formula (III)-4 (the value of c varies.) was produced to examine a relationship between the value of c and the discharge capacity after 100 cycles of charge/discharge operation were carried out, and the results are shown in FIG. 9. The experiment was carried out under the same conditions as those of the Experiment 2 of the Embodiment 1.

$$(Ti_{0.9}Zr_{0.1})_{0.7}(Mo_{0.8}V_{0.2})_{0.3}Ni_c \qquad (III)\text{-}4$$

As is apparent from FIG. 9, the discharge capacity grows up to 250 mAh/g or more when the range of c is $0.1 \leq c \leq 0.4$. Consequently, the preferable range of c in the general formula (III)-4 is $0.1 \leq c \leq 0.4$.

Embodiment 4

A hydrogen-absorbing alloy expressed by the general formula (III) below in which one element of Zr, Hf, Mg, Y, rare-earth element, Nd, Nb or Ta is employed as A, and another element of vanadium (V), chromium (Cr), tungsten (W), manganese (Mn), iron (Fe), copper (Cu), boron (B), carbon (C) or silicon (Si) is employed as B, and a cell having an electrode made therefrom were produced. (the values of x, a, b and c are respectively, $0.2 < x \leq 0.4$, $0.05 \leq a \leq 0.3$, $0.1 \leq b \leq 0.4$ and $0.1 \leq c \leq 0.4$.)

$$(Ti_{1-a}A_a)_{1-x}(Mo_{1-b}B_b)_x Ni_c \qquad (III)$$

Example 1

An electrode was produced in the same manner as the Example of the Embodiment 1 by employing the hydrogen-absorbing alloy noted in the Embodiment 3, $(Ti_{0.63}Zr_{0.07}Mo_{0.24}V_{0.06}Ni_{0.25})$. Then, a cell was produced in the same manner as the Experiment 2 of the Embodiment 1.

The cell thus produced is referred to as Cell(D1).

Examples 2–16

Figure 10:
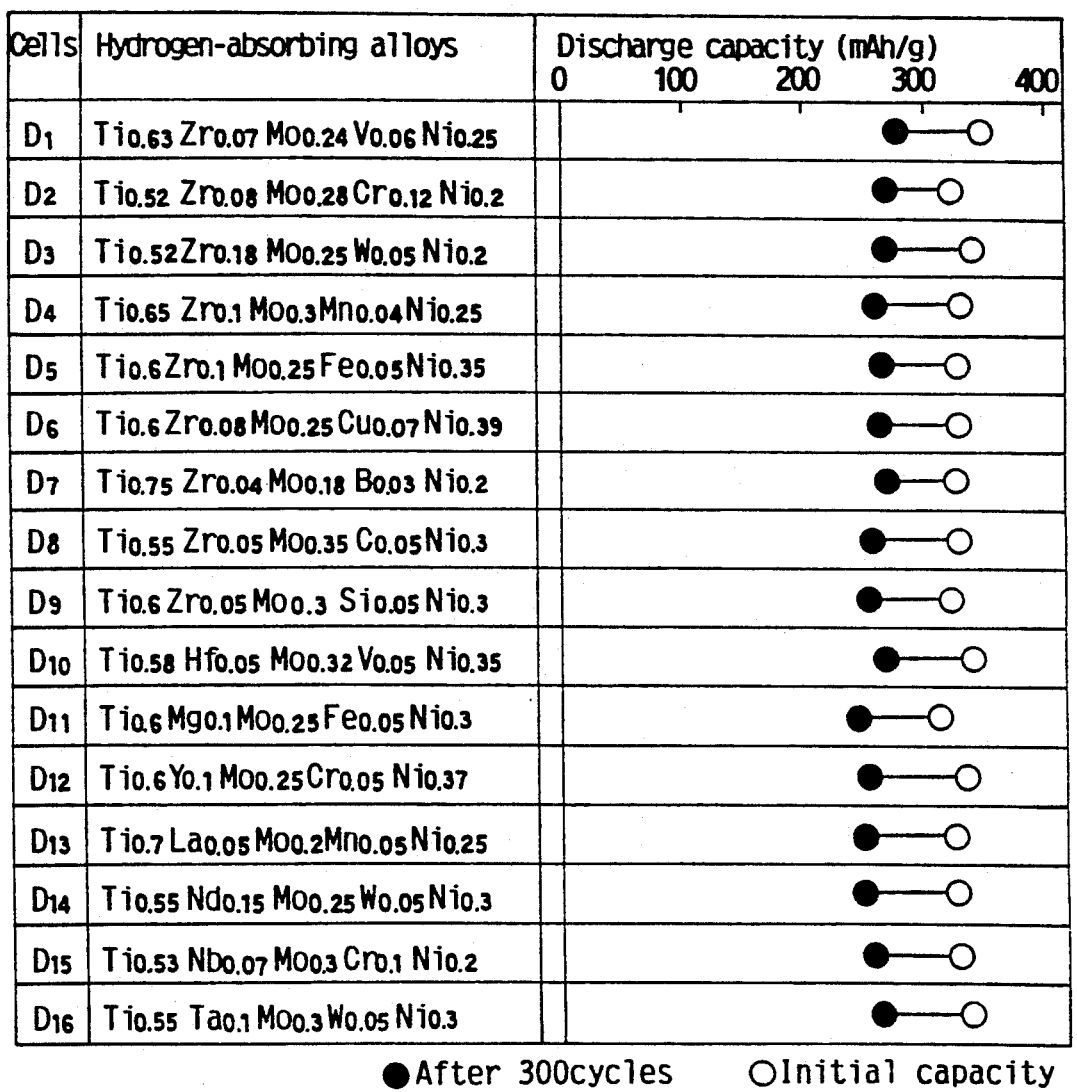
FIG. 10 is a graph showing examined results of the discharge capacity of the Cells(D1)-(D16) in the initial stage and after 300 cycles of charge/discharge operation which employed hydrogen-absorbing alloys of this invention.

Electrodes, and cells employing them were produced in the same manner respectively as the Example and the Experiment 2 of the Embodiment 1 except that as shown in FIG. 10, the following are used as hydrogen-absorbing alloys—$Ti_{0.52}Zr_{0.08}Mo_{0.28}Cr_{0.12}Ni_{0.2}$, $Ti_{0.52}Zr_{0.18}Mo_{0.25}W_{0.05}Ni_{0.2}$, $Ti_{0.65}Zr_{0.1}Mo_{0.3}Mn_{0.04}Ni_{0.25}$, $Ti_{0.6}Zr_{0.1}Mo_{0.25}Fe_{0.05}Ni_{0.35}$, $Ti_{0.6}Zr_{0.08}Mo_{0.2\text{-}5}Cu_{0.07}Ni_{0.39}$, $Ti_{0.75}Zr_{0.04}Mo_{0.18}B_{0.03}Ni_{0.2}$, $Ti_{0.55}Zr_{0.05}Mo_{0.35}Co_{0.05}Ni_{0.3}$, $Ti_{0.6}Zr_{0.05}Mo_{0.3}Si_{0.05}Ni_{0.3}$, $Ti_{0.58}Hf_{0.05}Mo_{0.32}V_{0.05}Ni_{0.35}$, $Ti_{0.6}Mg_{0.1}Mo_{0.25}Fe_{0.05}Ni_{0.3}$, $Ti_{0.6}Y_{0.1}Mo_{0.25}Cr_{0.05}Ni_{0.37}$, $Ti_{0.7}La_{0.05}Mo_{0.2}Mn_{0.05}Ni_{0.25}$, $Ti_{0.55}Nd_{0.15}Mo_{0.25}W_{0.05}Ni_{0.3}$, $Ti_{0.53}Nb_{0.07}Mo_{0.3}Cr_{0.1}Ni_{0.2}$, and $Ti_{0.55}Ta_{0.1}Mo_{0.3}W_{0.05}Ni_{0.3}$.

The Cells thus produced are hereinafter referred to as Cells(D2)–(D16) respectively.

Experiment

The discharge capacity of the Cells(D1)–(D16) in the initial stage and after 300 cycles of charge/discharge operation which employed hydrogen-absorbing alloys of this invention was examined, and the results are shown in FIG. 10. The conditions of the experiment are the same as those of the Experiment 2 of the Embodiment 1.

As is apparent from the FIG. 10, each of the Cells(D-1)–(D16) employing a hydrogen-absorbing electrode of this invention has larger discharge capacity both in the initial stage and after 30 cycles of charge/discharge operation.

Other Points (1) Hydrogen-absorbing alloys can be produced not only by the method using an arc welding furnace described in the above embodiment, but also by other methods such as high frequency induction heating, having the same effects.

Embodiment 5

Example 1

First, commercially available Ti, Zr, Mo, W and Ni were weighed to be in the specified elemental ratio, and melted to produce a melt in an arc welding furnace, using an argon atmosphere. Next, the melt was cooled to produce an ingot of a hydrogen-absorbing alloy expressed by $(Ti_{0.9}Zr_{0.1})_{0.6}(Mo_{0.9}W_{0.1})_{0.4}Ni_{0.3}$. Then, the ingot was kept in a vacuum heat treating furnace at 1100° C., $10^{-5}$ Torr for 12 hours, and then left until it was cooled at the room temperature.

The alloy thus produced is hereinafter referred to as Alloy(e1).

An electrode employing the Alloy(e1) was produced in the same manner as the Example of the Embodiment 1, and a cell employing it was produced in the same manner as the Experiment 2 of the Embodiment 1.

The cell thus produced is hereinafter referred to as Cell(E1).

Example 2

Hydrogen-absorbing alloy ingot produced in an arc welding furnace as described in the above Example, is rapidly quenched by a rapid quenching apparatus having a single roll as follows.

First, the above-mentioned hydrogen-absorbing alloy ingot is crushed to particles having an average diameter in the range between about 5-15 mm to be put into a calcium oxide nozzle (round and 1.0 mm in diameter) of the rapid quenching apparatus whose inside is impregnated with high purity argon gas (purity of 4N or higher). Then, the alloy particles are melted by applying high frequency of 5 KW according to radio-frequency heating. Later, by applying the pressure of argon gas to the inside of the nozzle, the melt is blown on a copper roller (300 mm Φ, 2000 rpm) which is rotating at a high speed, and is rapidly quenched. The form of the obtained alloy is a thin stripshape (thickness: 50-100 μm).

The hydrogen-absorbing alloy thus produced is hereinafter referred to as Alloy(e2).

An electrode employing the Alloy(e2), and a cell employing the electrode were produced in the same manner respectively as the Example and the Experiment 2 of the Embodiment 1.

The cell thus produced is hereinafter referred to as Cell(E2).

EXAMPLE 3

Hydrogen-absorbing alloy ingot produced in an arc welding furnace described in the above Example was rapidly quenched by a gas atomizing rapid quenching apparatus as follows.

First, the above-mentioned hydrogen-absorbing alloy ingot is crushed to particles having an average diameter in the range between about 5-15 mm to be put into a calcium oxide nozzle (round and 1.0 mm in diameter) of the rapid quenching apparatus whose inside is impregnated with high purity argon gas (purity of 4N or higher). Then, the crushed alloy particles are melted by applying high frequency of 5 KW according to radio-frequency heating. Later, by applying the pressure of argon gas to the inside of the nozzle, the melt is blown in the argon gas atmosphere which is fluxing at a high speed, and is quenched. Consequently, alloy powder having an average particle diameter in the range between about 10-30 μm was gained.

The hydrogen-absorbing alloy thus produced is hereinafter referred to as Alloy(e3).

An electrode employing Alloy(e3), and a cell employing the electrode were produced in the same manner respectively as the Example and the Experiment 2 of the Embodiment 1.

The cell thus produced is hereinafter referred to as Cell(E3).

Example 4

A hydrogen-absorbing alloy was produced in the same manner as the above Exmple 1 except that the obtained hydrogen-absorbing alloy ingot was not annealed. In other words, the hydrogen-absorbing alloy of this example has the same construction as that of the Example 1 of the Embodiment 3.

The hydrogen-absorbing alloy thus produced is hereinafter referred to as Alloy(e4).

An electrode employing the Alloy(e4), and a cell employing the electrode were produced in the same manner respectively as the Example and the Experiment 2 of the Embodiment 1.

The cell thus produced is hereinafter referred to as Cell(E4).

Comparative Examples 1-6

Used as these Comparative Examples 1-6 were the Alloys(x1)-(x6) of the Comparative Examples of the Embodiment 1 and the Cells(X1)-(X6) of the Comparative Examples 1-6 of the Embodiment 3.

Experiment 1

The Alloys(e1)-(e4) used for electrodes of the present invention were compared with the Alloys(x1)-(x6) used for those of the Comparative Examples to examine their degrees of difficulty in crushing, and the results are shown in Table 3 below. The experiment was carried out in the same way as the Experiment 1 of the Embodiment 1. In Table 3, the time required for powdered Alloy(e4) is made 1.

TABLE 3

| Hydrogen-absorbing alloys | Treatment | Ratio *1) | Number *2) |
|---|---|---|---|
| e1 $[(Ti_{0.9}Zr_{0.1})_{0.6}(Mo_{0.9}W_{0.1})_{0.4}Ni_{0.3}]$ | annealing | 0.8 | 2 times |
| e2 $[(Ti_{0.9}Zr_{0.1})_{0.6}(Mo_{0.9}W_{0.1})_{0.4}Ni_{0.3}]$ | quenching | 0.2 | 2 times |
| e3 $[(Ti_{0.9}Zr_{0.1})_{0.6}(Mo_{0.9}W_{0.1})_{0.4}Ni_{0.3}]$ | quenching | 0 | 2 times |
| e4 $[(Ti_{0.9}Zr_{0.1})_{0.6}(Mo_{0.9}W_{0.1})_{0.4}Ni_{0.3}]$ | / | 1 | 3 times |
| x1 $(Ti_{0.5}Mo_{0.5}Co_{1.0})$ | / | 2 | *3) |
| x2 $(Ti_{0.6}Mo_{0.4})$ | / | 3 | *4) |
| x3 $(Zr_{1.0}Mo_{0.6}Cr_{0.2}Ni_{1.2})$ | / | 1.5 | 8 times |
| x4 $(Ti_{0.7}Zr_{0.3}Cr_{1.5}Ni_{0.5})$ | / | 2 | 6 times |
| x5 $(Zr_{1.0}Mo_{0.3}Ni_{1.7})$ | / | 1.5 | 4 times |
| x6 $(Pd_{20}Mo_{30}Ti_{50})$ | / | 1.5 | 10 times |

*1) Ratio of time required for powdered alloy
*2) Cycle numbers of activation treatment
*3,4) (capacity: below 20 mAh/g)

As is apparent from Table 3, the Alloys (e1)-(e4) used for electrodes of the present invention can be powdered in a shorter time than the Alloys (x1)-(x6) used for those of the Comparative Examples. Especially, the Alloys (e1)-(e3) which were annealed or rapidly quenched, can be powdered in remarkably short time.

Experiment 2

The Cells (E1)-(E4) employing electrodes of the present invention were compared with the Cells (X1)-(X6) employing those of the Comparative Examples to measure their activation treatment time, and the results are shown in Table 3. The conditions of the experiment were the same as those of the Experiment 2 of the Embodiment 1. In Table 3, the discharge cycle numbers of each cell required to gain 90% or more of the maximum discharge capacity (referred to as activation treatment cycle number) are shown.

As is apparent from the Table 3, the Cells (E1)-(E4) employing electrodes of the present invention have the smallest activation treatment cycle number and demand the shortest activation treatment time, as compared with the Cells (X1)-(X6) employing electrodes of the Comparative Examples. Especially, in the cases the Cells (E1)-(E3) which were annealed or rapidly quenched, the time for activation treatment was greatly shortened.

Experiment 3

The Alloys (e1)-(e3) of the present invention were analyzed by use of a SEM, an EPMA and powder X-ray diffraction in order to find out the reason that the alloys are easily powdered and demand short activation treatment time. As a result, it was confirmed that an alloy phase of Ti$_2$Ni system cubic-structure and another alloy phase of Ti-Ni system monoclinic-structure precipitated besides the main alloy phase of Ti-Mo system cubic-structure to form an alloy having multi-phase structure.

The Ti-Ni system alloy phase precipitated in the Ti-Mo system alloy is considered to make the discharge capacity of the TiMo-based alloy increase because it strongly catalyzes an electrochemical hydrogen absorbing-desorbing reaction. Also, the precipitation of the Ti-Ni system alloy phase is considered to make the metal composition of the alloy heterogeneous, causing some cracks to occur, the alloy to crush easily and the activation treatment time to shorten during repeated charge/discharge operation.

It was confirmed through experiments that these effects worked better when the alloy was heat-treated (annealing or quenching). This is considered to come from the following reasons.

By carrying out an anneal treatment, the homogeneity of the interior of the main phase improves, which is most concerned with absorbing/desorbing reactions of hydrogen, and as a result the discharge capacity increases. In addition, crushing of the alloy becomes easier because its grain boundaries become clear.

By carrying out a rapid quenching, on the other hand, the precipitation of such phases are restrained that are not concerned with absorbing/disrobing reactions of hydrogen. As a result, the area of the main phase expands and the discharge capacity increases. Moreover, the form of the alloy after quenching is a thin strip or powder, so that it can easily be powdered.

Experiment 4

Figure 11:
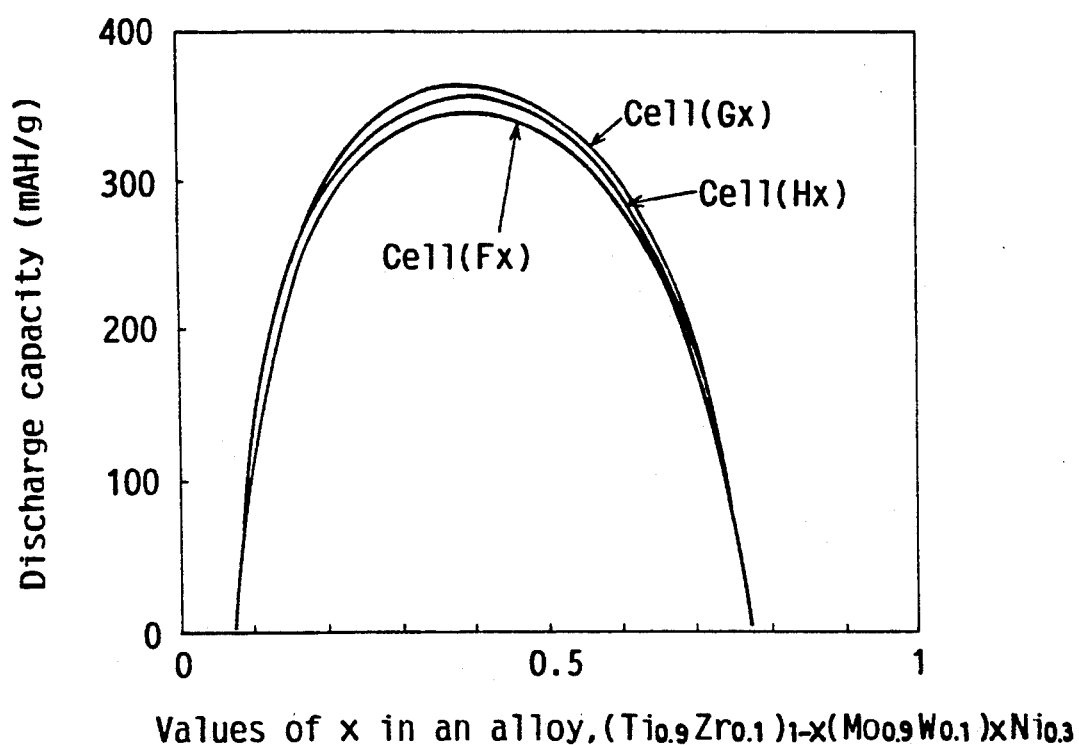
FIG. 11 is a graph showing a relationship between a value of x in an alloy expressed by $(Ti_{0.9}Zr_{0.1})_{1-x}(Mo_{0.9}W_{0.1})_xNi_{0.3}$ and the discharge capacity.

A cell employing a hydrogen-absorbing alloy expressed by the general formula (III)-5 (the value of x varies in the range of $0.1 \leq x \leq 0.9$) was produced to examine the relationship between the value of x and the discharge capacity after 100 cycles of charge/discharge operation were carried out, and the results are shown in FIG. 11. The experiment was carried out under the same conditions and the cells used for this experiment have the same construction as those of the Experiment 2 of the Embodiment 1 except a hydrogen-absorbing alloy expressed by the general formula (III)-5 was used.

$$(Ti_{0.9}Zr_{0.1})_{1-x}(Mo_{0.9}W_{0.1})_xNi_{0.3} \qquad \text{(III)-5}$$

In FIG. 11, the hydrogen-absorbing alloy used for Cell(Fx) was annealed in the same manner as the above Example 1, the hydrogen-absorbing alloy used for Cell(Gx) was rapidly quenched in the same manner as the Example 2 and the hydrogen-absorbing alloy used for Cell(Hx) was rapidly quenched in the same manner as the Example 3.

As apparent from FIG. 11, the discharge capacity grows up to 270 mAh/g or more when the range of x is $0.2 \leq x \leq 0.6$. Consequently, the preferable range of x in the general formula (III)-5 is $0.2 \leq b \leq 0.6$.

Experiment 5

Figure 12:
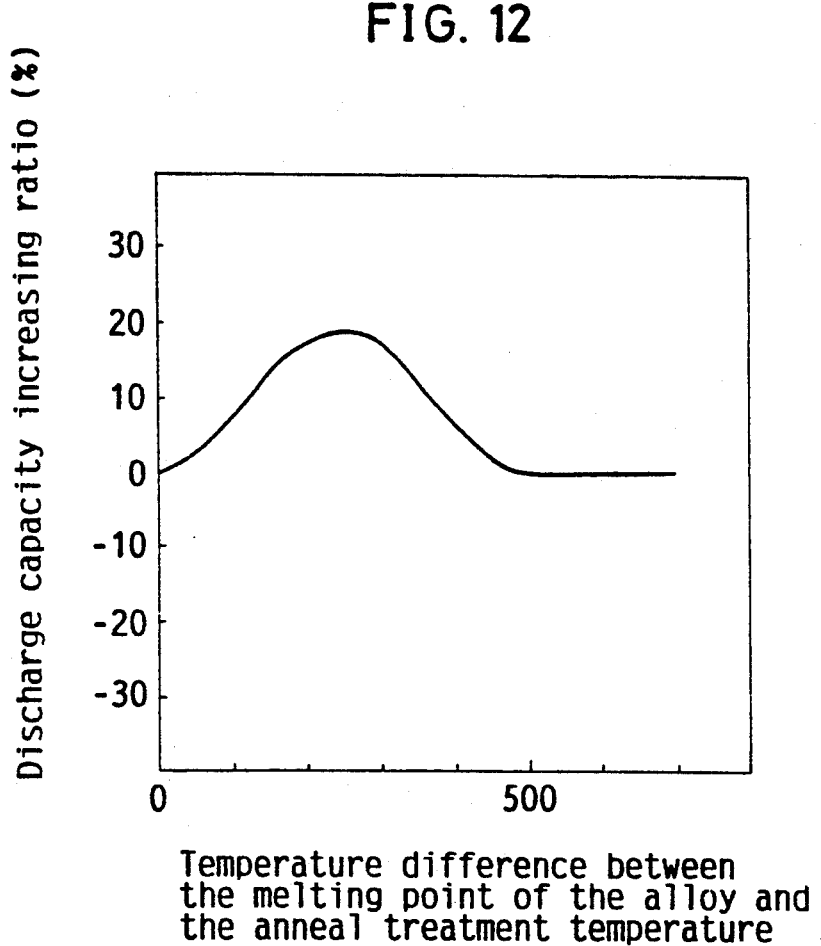
FIG. 12 is a graph showing a relationship between the temperature difference of the melting point of an alloy and an anneal treatment, and discharge capacity increasing ratio.

When a hydrogen-absorbing alloy was produced as in the above Example 1, a relationship between an anneal treatment temperature and discharge capacity increasing ratio was examined, and the results are shown in FIG. 12.

As apparent from FIG. 12, the discharge capacity increased when the range of anneal treatment temperature is from the melting point of the hydrogen-absorbing alloy to a temperature 500° C. below the melting point. Consequently, the preferable range of the anneal treatment temperature is from the melting point of the hydrogen-absorbing alloy to a temperature 500° C. below the melting point.

When the anneal treatment temperature is lower than 500° C. below the melting point, the discharge capacity is considered not to remarkably increase because of the slow spread of the constituent elements of the alloy.

Experiment 6

Figure 13:
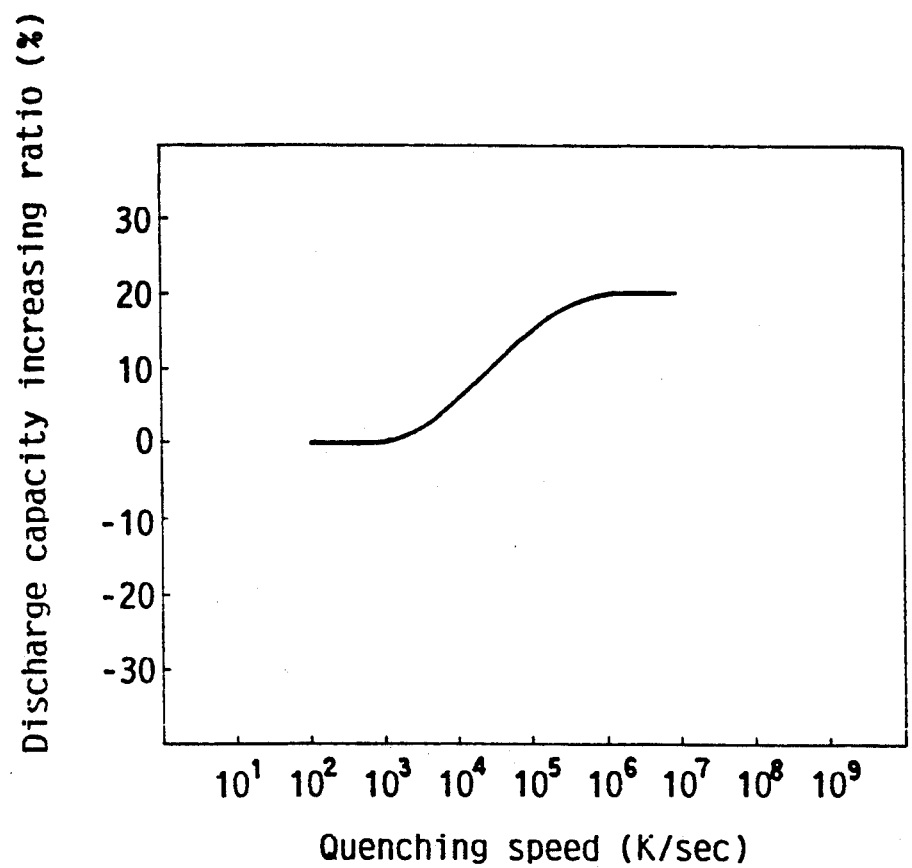
FIG. 13 is a graph showing a relationship between quenching speed and the discharge capacity increasing ratio.

When a hydrogen-absorbing alloy was produced as in the Embodiments 2 and 3, the relationship between quenching speed and discharge capacity increasing ratio was examined, and the results are shown in FIG. 13.

As apparent from FIG. 13, the discharge capacity increased remarkably when the quenching speed was $10^3$K/sec or more. Consequently, the preferable quenching speed is $10^3$K/sec or more.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A hydrogen-absorbing alloy electrode including a hydrogen-absorbing alloy capable of absorbing and desorbing hydrogen reversible, the electrode being characterized in that the hydrogen-absorbing alloy forms a multi-phase structure composed of at least these three phases, a main alloy phase, an alloy phase of Ti$_2$Ni system cubic-structure and an alloy phase of Ti-Ni system monoclinic-structure, and the main alloy phase has TiMo-based crystalline cubic-structure.

2. A hydrogen-absorbing alloy electrode of claim 1, wherein an alloy expressed by the general formula (I) as follows is used for the alloy phase of TiMo-based crystalline cubic-structure:

$$Ti_{1-x}Mo_x \quad (I)$$

in the general formula (I), the range of x is $0.2 < x < 0.6$.

3. A hydrogen-absorbing alloy electrode of claim 1, wherein the composition of the entire hydrogen-absorbing alloy is expressed by the general formula (II) as follows:

$$(Ti_{1-a}A_a)_{1-x}(Mo_{1-b}Ni_b)_x \quad (II)$$

in the general formula (II), A is one or more elements selected from the group consisting of zirconium, hafnium, magnesium, yttrium, rare-earth element, niobium, neodymium or tantalum, and the ranges of a, b and x are respectively, $0.05 \leq a \leq 0.3$, $0.1 \leq b \leq 0.5$ and $0.2 < x < 0.6$.

4. A hydrogen-absorbing alloy electrode of claim 1, wherein the composition of the entire hydrogen-absorbing alloy is expressed by the general formula (III) as follows:

$$(Ti_{1-a}A_a)_{1-x}(Mo_{1-b}B_b)_xNi_c \quad (III)$$

in the general formula (III), A is one or more elements selected from the group consisting of zirconium, hafnium, magnesium, yttrium, rare-earth element, niobium, neodymium or tantalum and B is one or more elements selected from the group consisting of vanadium, chromium, tungsten, manganese, iron, copper, boron, carbon or silicon, and the ranges of a, b, c and x are respectively, $0.5 \leq a \leq 0.3$, $0.1 \leq b \leq 0.4$, $0.1 \leq c \leq 0.4$ and $0.2 < x \leq 0.4$.

5. A hydrogen-absorbing alloy electrode of claim 1, wherein the hydrogen-absorbing alloy having multiphase structure is annealed.

6. A hydrogen-absorbing alloy electrode of claim 2, wherein the hydrogen-absorbing alloy having multiphase structure is annealed.

7. A hydrogen-absorbing alloy electrode of claim 3, wherein the hydrogen-absorbing alloy having multiphase structure is annealed.

8. A hydrogen-absorbing alloy electrode of claim 4, wherein the hydrogen-absorbing alloy having multiphase structure is annealed.

9. A hydrogen-absorbing alloy electrode of claim 5, wherein the anneal treatment temperature is in the range from the melting point of the hydrogen-absorbing alloy to a temperature 500° C. below the melting point of the alloy.

10. A hydrogen-absorbing alloy electrode of claim 6, wherein the anneal treatment temperature is in the range from the melting point of the hydrogen-absorbing alloy to a temperature 500° C. below the melting point of the alloy.

11. A hydrogen-absorbing alloy electrode of claim 7, wherein the anneal treatment temperature is in the range from the melting point of the hydrogen-absorbing alloy to a temperature 500° C. below the melting point of the alloy.

12. A hydrogen-absorbing alloy electrode of claim 8, wherein the anneal treatment temperature is in the range from the melting point of the hydrogen-absorbing alloy to a temperature 500° C. below the melting point of the alloy.

13. A hydrogen-absorbing alloy electrode of claim 1, wherein the hydrogen-absorbing alloy having multiphase structure is quenched at a quenching speed of more than $10^3$ K/sec.

14. A hydrogen-absorbing alloy electrode of claim 2, wherein the hydrogen-absorbing alloy having multiphase structure is quenched at a quenching speed of more than $10^3$ K/sec.

15. A hydrogen-absorbing alloy electrode of claim 3, wherein the hydrogen-absorbing alloy having multiphase structure is quenched at a quenching speed of more than $10^3$ K/sec.

16. A hydrogen-absorbing alloy electrode of claim 4, wherein the hydrogen-absorbing alloy having multiphase structure is quenched at a quenching speed of more than $10^3$ K/sec.

* * * * *